Aug. 26, 1952     A. E. DRISSNER     2,608,415
DOUBLE END TURNING MACHINE
Filed Oct. 11, 1950     2 SHEETS—SHEET 1

INVENTOR.
ALFRED E. DRISSNER
BY
Woodling and Krost
attys

Aug. 26, 1952
A. E. DRISSNER
2,608,415
DOUBLE END TURNING MACHINE
Filed Oct. 11, 1950
2 SHEETS—SHEET 2
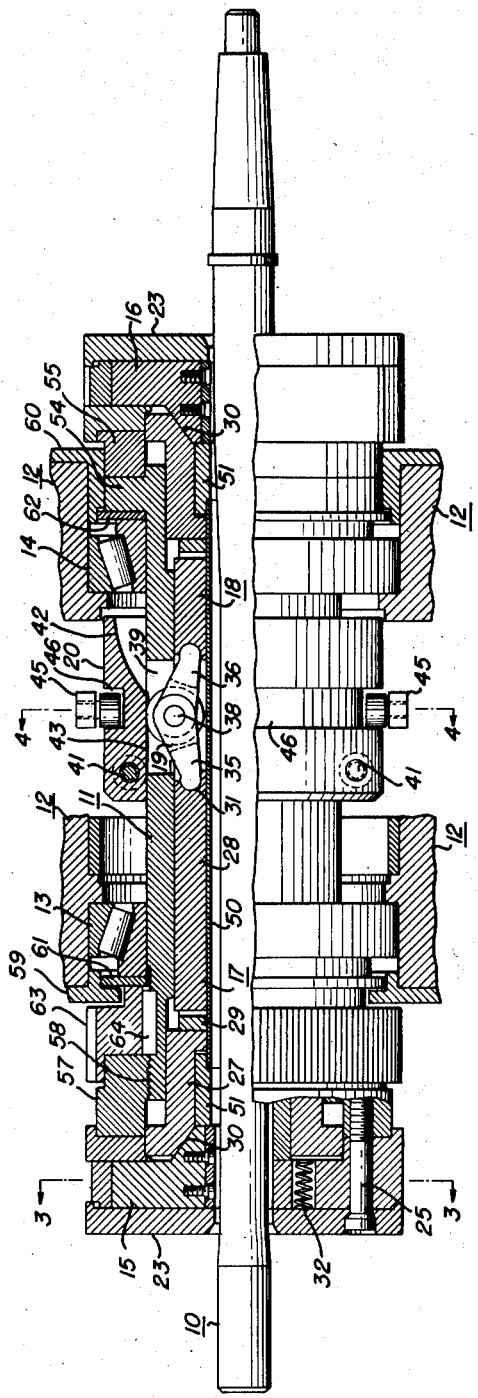
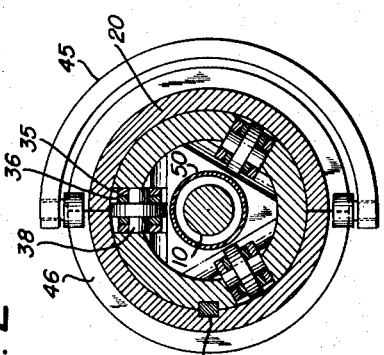
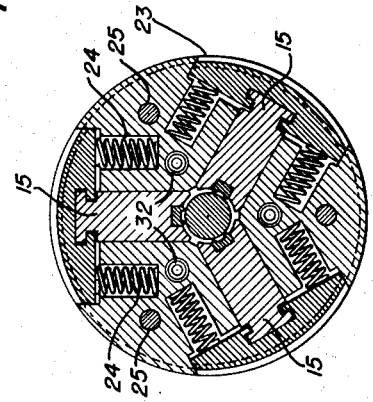
INVENTOR.
ALFRED E. DRISSNER
BY Patented Aug. 26, 1952

2,608,415

UNITED STATES PATENT OFFICE 2,608,415

DOUBLE END TURNING MACHINE

Alfred E. Drissner, Cleveland, Ohio, assignor to The National Acme Company, a corporation of Ohio Application October 11, 1950, Serial No. 189,537

12 Claims. (Cl. 279—110)

The invention relates to a double-end turning mechanism for turning a workpiece having an axis and opposite ends to be worked simultaneously.

The present invention as illustrated and described herein was constructed for turning axles for automobiles. It is understood, however, that the term "axle" as used throughout the specification is meant to include any workpiece which is to be chucked at longitudinally spaced locations therealong so that both ends of the workpiece may be turned or worked simultaneously. It is also understood that the exact shape and size of the workpiece may be other than the exact shape and size of the axle illustrated herein and that the illustrated axle is a specific one of many types of axles.

The double-end turning mechanism herein is in the form of a spindle designed for a predetermined maximum length over all. This maximum length is governed by the length of the shafts, workpieces, or axles which are to have both ends thereof machined or worked at the same time. The spindle has a chuck on each end thereof to grip the workpiece at axially or longitudinally spaced locations other than the very ends of the workpiece. In this way, both ends of the workpiece stick out of opposite sides of the machine and are easily accessible by working tools to perform the operations required. In making most axles, the axle is first forged and the end machined later. On most of these axles, the center portion which is forged is of a smaller diameter than the turned portions on the ends. For example, one end of the axle as shown in the drawings is smaller than the other end and both ends are larger than the center portion of the axle. It is also noted that the shaft is slightly tapered in the region in which it must be gripped by one of the chucks. Thus, allowance must be made for this taper on the forged portion so that the chucks may grip the axle uniformly at both axially or longitudinally spaced positions thereon.

Now to grip the shaft tight enough to perform the turning operation with modern carbide tools, it takes gripping power, and at the same time sufficient travel for the chuck jaws to clear the large portion of the shaft when the piece is entered into the spindle or withdrawn from the spindle, which is generally done automatically by means of air or hydraulic cylinders to save labor. To provide sufficient power and still allow not only extreme travel for the chuck jaws, but also to compensate for the variation of the diameter of the shafts, which normally vary $\frac{1}{32}$ of an inch plus or minus, and to accomplish even and uniform grip on both ends, it was necessary to design a movement to operate the chuck jaws to take care of the extreme travel and also to accomplish the gripping power required for turning the piece or machining the piece. Since the design is complicated by a limited space in which is required a powerful driving means for the spindle and the anti-friction bearing construction required for this heavy operation, it was necessary to design a spindle which was compact yet rugged.

The spindle or double-end turning mechanism illustrated and described herein may be used as a single spindle machine or it may be incorporated into a multiple spindle automatic machine designed to machine axles, shafts, or similar work. When used on multiple spindle machines in a spindle carrier, it can be manufactured with six spindles in one spindle carrier, to allow us sufficient stations to perform the operation in the fastest way possible and divide up the tooling and still leave a position free to load and unload the piece during the working cycle. So there is no time lost for loading and while the machining operations are divided between several spindles from both ends, the production cycle is controlled by the longest operation in one position. Since the tools are divided, this shaft, for example, can be machined with this method about ten times as fast as any previous method used for the same operation. In this case, a single spindle is illustrated for handling a specific automobile axle shaft which has to be machined from both ends to hold the concentricity and straightness which is very important.

In general, the axles are of different designs. It is usual that they have on one end a turned portion, centered, which is later splined, and on the other end they have the portions where the anti-friction bearings are mounted. In this case, as shown on the drawings, a tapered portion is provided to mount the automobile wheel flange. In other cases the taper is replaced by a flame, but has the straight portion and shoulders for mounting the bearings. So, the form of the shaft and the operations to machine the shaft are not changed, with the exception that to perform this operation, which was previously done between centers or some other makeshift set ups, a spindle provided with a three-jaw chuck on each end and operated from the center of the spindle was designed.

With these views and this background in mind, it is apparent that one of the objects of the present invention is to provide a double-end turning mechanism which has a powerful grip for gripping a workpiece at longitudinally or axially spaced locations.

Another object of the invention is to provide a spindle with a chuck on each end thereof wherein the chucks are simultaneously operated to grip a workpiece.

Another object of the invention is to provide a spindle with chucks which grip longitudinally spaced locations of a workpiece with the same gripping pressure.

Another object of the invention is to provide a double-end turning mechanism with chucks on each end thereof, wherein the chucks are operated from the center thereof.

Another object of the invention is to provide chuck jaws on each end of a double-end turning mechanism which may be radially separated to receive a workpiece having an enlarged end and which may be radially closed sufficient to grip the small center part of that workpiece.

Another object of the invention is to provide a rotary spindle with chuck jaws on each end thereof and with a tube therein for preventing undesired materials entering the working parts of the spindle.

Another object of the invention is to provide a chucking mechanism with spaced chuck jaws which are restrained against axial movement and which are moved radially to grip the workpiece.

Other objects and a better understanding of the invention may be had by referring to the following description and claims, taken in conjunction with the accompanying drawing, in which:

Figure 2 is an elevational view along the lines of Figure 1 with the chuck jaws closed and gripping a workpiece, such as an axle.

Figure 3 is a sectional view along the lines 3—3 of Figure 2; and

Figure 4 is a sectional view along the lines 4—4 of Figure 2.

Figure 1:
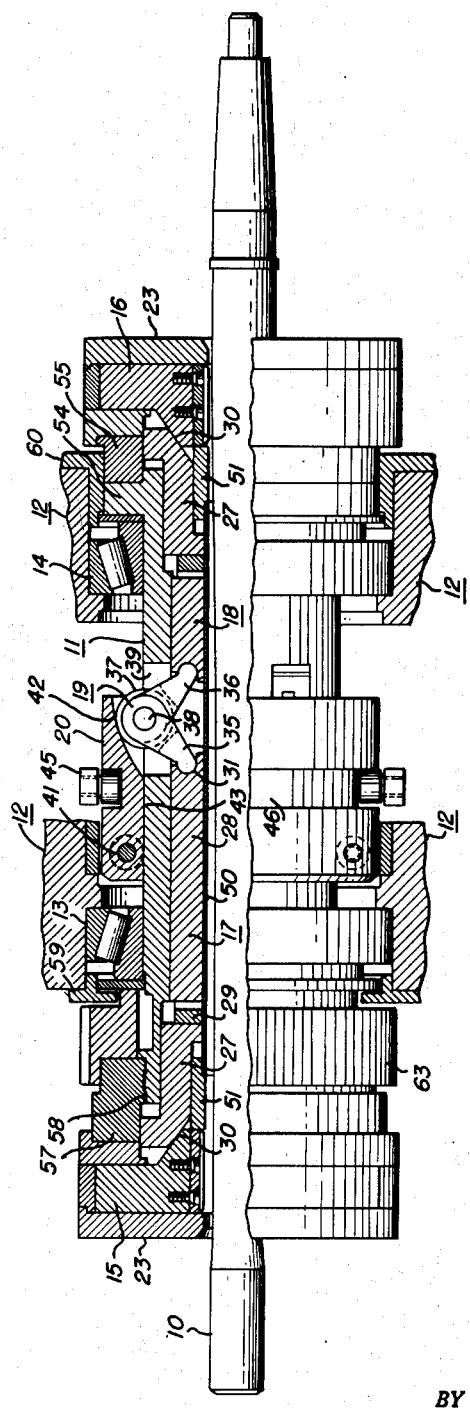
Figure 1 is a side elevational view of the double-end turning mechanism with part thereof in cross-section and showing the chuck jaws in open position.

Throughout the application, the similar reference characters on the various figures of the drawings, refer to the same parts. The exact arrangement of parts and the exact description and structure herein may be varied and modified without departing from the spirit and scope of the invention, since the illustrations and description are of the preferred embodiment of the invention.

The double-end turning mechanism for turning a workpiece having an axis and opposite ends to be worked simultaneously is best illustrated in Figures 1 and 2 of the drawings. In this instance, an axle 10 is illustrated as being the workpiece. In viewing the Figure 1, it is noted that the axle 10 has both ends thereof of larger diameter than the diameter of the portions which are to be gripped by the chuck jaws. Furthermore, the portion of the axle 10 to be gripped by one chuck jaw is slightly tapered. These axles, when inserted in the double-end turning mechanism or machine, are rough forging and may have a variation in diameter up to a plus or minus $\frac{1}{32}$ of an inch. The machine must be able to automatically compensate for this variation in the diameter and other irregularities in the axle so that it can grip every axle inserted therein with sufficient gripping power to machine both ends of the axle 10 at the same time. Actual tests run on an experimental model of this invention showed that the machine or double-end turning mechanism has more than the necessary gripping power required. For example, it is necessary to have a driving motor of about 8 horse-power for running the machine, while all of the tools are working on the ends of the axle. In actual tests, a 16 horse-power motor was used to drive the axle through the herein disclosed double-end turning mechanism and that 16 horse-power motor was stalled by stopping the axle without any slippage in the chuck jaws. In another test on the machine, the chuck jaws were opened and closed on one axle more than 20,000 times without severe damages to or marring of the surface of the forging.

The double-end turning mechanism illustrated herein has a hollow rotary spindle 11 which has an axial length less than the axial length of the workpiece 10 to be turned whereby both ends of the workpiece may be worked simultaneously. The hollow rotary spindle 11 is supported in a housing 12 by spaced bearing supports 13 and 14 for rotational turning.

The housing 12 may be a housing of a single spindle machine or it may be a structure supporting a plurality of these spindles in a multiple spindle machine.

On the ends of the spindle 11 are jaw-type chucks 15 and 16 respectively. These chucks 15 and 16 are spaced apart a distance less than the axial distance between the ends of the axle or other workpiece 10 which is to be machined or worked. Thus, the chucks 15 and 16 on each end of the spindle 11 grip the workpiece at axially spaced locations other than the very ends of the workpiece. The jaws of chucks 15 and 16 are radially moved inwardly to grip the workpiece 10 by a pair of axially separable sleeves slidable in the spindle. These sleeves are numbered 17 and 18 with the sleeve 17 cammingly engaging the jaws of chuck 15 with the sleeve 18 cammingly engaging the jaws of chuck 16. The sleeves 17 and 18 are separated by toggles 19 which may be compressed by a spool 20. When the spool 20 is moved in one direction on the hollow rotary spindle 11, it operates through the toggles 19 to separate the sleeves 17 and 18, thereby camming the jaws of chucks 15 and 16 radially inwardly and into gripping position against the axle 10. Figure 1 illustrates the chuck jaws in open position and Figure 2 illustrates the chuck jaws in closed position with the spool 20 having been moved to depress the toggle 19 and separate sleeves 17 and 18.

The chucks described herein are of the form described and claimed in the co-pending application entitled "Chucking Mechanism" by the same inventor and filed October 11, 1950, Serial No. 189,559. The description, claims and drawings of the chucks in the co-pending application are incorporated herein and made a part hereof the same as if they had been completely copied and inserted in this application.

In Figure 3, a sectional view along the line 3—3 of Figure 2 illustrates that there are three jaws in chuck 15 on one end of the spindle 11. The chuck 16 is identical or very similar to the chuck 15. More or less than three jaws may be used in each chuck without departing from the spirit and scope of the invention. However, three jaws have been found to operate very satisfactorily in this instance. In describing the chucking mechanism herein, the numbers and structure around chuck 15 will be referred to, it being understood that similar structure is used around chuck 16. The chuck jaw 15 is provided with a cover, such as the cover 23, which practically fully encloses the jaw 15 and supports it for radial movement towards and away from the workpiece. The cover 23 is mounted on the end of the hollow rotary spindle 11 for rotation therewith by bolts 25 or other suitable fastening means. Springs 24 in the cover 23 are positioned in such manner between the chuck jaws and the cover whereby the springs normally urge the jaws radially outwardly from the axis of the spindle thereby urging separation of the chuck jaws. The springs 24 also keep the jaws of each chuck 15 and 16 in cammed engagement with its respective of the sleeves 17 and 18. When the sleeves 17 and 18 are separated to cam the chuck jaws 15 and 16 inwardly, the springs 24 are compressed.

Each chuck 15 and 16 is adapted to its respective end of the hollow rotary spindle by an adapter. The adapter for chuck 15 in Figure 2 is referenced by number 57. The adapter for chuck 15 is also threaded onto the end of spindle 11. The adapter for chuck 16 is referred to by reference character 55. These adapters will be more fully described later. The bolts 25 extend through the respective cover plates and adapters to hold the chucks on the ends of the spindles.

Each sleeve 17 and 18 is constructed of two portions separated by a heavy resilient spring washer of the ocean-wave type. Since the structure of the two sleeves 17 and 18 is substantially the same, the structure of the sleeve 17 will be described for purposes of illustration. The sleeve 17 comprises a first sleeve portion 27 and the second sleeve portion 28 separated by the spring washer 29. The first sleeve portion 27 has cam surfaces 30 on the end thereof for each chuck jaw 15 with each cam surface 30 in camming engagement with its respective chuck jaw 15. The first sleeve portion 27 is slidable in the end of the hollow rotary spindle 11 and thus is movable axially relative to the cover 23 of the jaw 15.

The second sleeve portion 28 has a recess in the end thereof adapted to receive and cooperate with one extreme end of toggle 19. This second sleeve portion 28 is also axially slidable in the hollow rotary spindle 11 and is separated from the first sleeve portion 27 by the washer 29. In this particular instance, since large forces are involved in very confined space, the washer 29 is in the shape of an ordinary corrugated washer, commonly termed an "ocean wave" spring. The springiness or resiliency required is obtained when the second sleeve portion pushes the washer 29 against the first sleeve portion, thus tending to flatten the washer 29. It is understood that for other devices other types of resilient means may be found more advisable to use than the specific corrugated or "ocean wave" washer 29 which has been used herein. The sleeve 18 is constructed in the same manner as the sleeve 17 and comprises the same parts that the sleeve 17 comprises. Between the cover plate 23 on chuck 15 and the respective camming or first sleeve 27 is a spring 32. The camming sleeve 27 is urged towards the center of the spindle and away from the chuck 15 by this spring 32. A similar spring in the other end of the double-end turning mechanism urges the respective sleeve 18 away from the chuck 16. These sleeves in both ends of the spindle 11 thereby urge the sleeves 17 and 18 towards each other and urge the toggle 19 outwardly radially against the spool 20. The springs 32 are not as strong as the "ocean wave" washer spring 29.

As has been previously described, the sleeves 17 and 18 may be separated or forced apart axially by a force exerting means, such as the toggle 19. This force exerting means or toggle 19 comprises a pair of fingers 35 and 36 pivotally joined together at the mean ends thereof with the extreme end of each finger abutting its respective sleeve, that is; the extreme end of the finger 35 abuts the second sleeve portion 28 of the sleeve 17 and the extreme end of the finger 36 abuts the second sleeve portion of the sleeve 18. To prevent slipping or jamming or other unwanted movement between the extreme end of the finger 35 and the second sleeve portion 28, the extreme end of the finger 35 is socketed in the recess 31. The extreme end of the finger 36 is similarly socketed in a recess in the sleeve 18.

In the present instance, there are three toggles, one for each chuck jaw. These toggles are equally spaced around the axis of the spindle 11. It is understood, however, that the number of toggles being used may be changed, depending on the requirements of the specific double-end turning mechanism being constructed. One toggle is described herein since the others are similar thereto in both operation and structure.

Each toggle 19 also has a toggle roller 37. The mean ends of the fingers 35 and 36 are pivotally joined with their pivot axis on the axis of the toggle roller 37 by a pin 38. The pin 38 pivotally connects the mean ends of the fingers 35 and 36 to the toggle roller 37. When the chuck is opened, the fingers 35 and 36 in the toggle 19 are at an acute angle with the toggle in what might be termed a non-straight position. That is, the pivot axis or the pin 38 of the toggle is further from the axis of the spindle, than when the toggle is straightened to separate the sleeves 17 and 18 to close the chuck jaws 15 and 16.

The spool 20 which is slidable externally of the spindle 11 is pushed over the roller of the toggle 19 to straighten the fingers 35 and 36 to separate the sleeves 17 and 18 which are slidable internally of the spindle 11. The spindle 11 has an aperture 39 through which the toggle 19 extends with the extreme ends of the fingers 35 and 36 abutting and engaging the mean ends of the sleeves 17 and 18 respectively and with the roller 37 engageable by the spool 20.

The spool 20 is constructed in this instance from two half-spools fastened together by screws 41 so that the spool 20 may be separated and removed from the spindle without taking the spindle apart. When the screws 41 are removed from the two halves of the spool, the half-spools are removed from opposite sides of the spindle. This type of construction also permits insertion and removal of the toggles 19 without disassembling the spindle or the entire chucking mechanism.

The spool 20 is provided with a tapered cam surface 42 disposed at an angle to the axis thereof and provided by a slot cut into the inside of the spool from one end thereof. This cam surface 42, defined by the bottom of the slot, extends from the end of the spool 20 to the inside surface 43 thereof. There is a cam surface 42 defined by a slot in the spool 20 for each toggle 19. The slot has a width slightly greater than the thickness of the toggle whereby the toggle and toggle roller enter the slot and are maintained in proper alignment by the opposing walls of the slot. The opposing walls of the slot are preferably aligned with the opposing walls of the aperture 39 in the spindle 11. As is illustrated in Figure 1, the cam surface 42 engages the toggle roller 37 when the fingers 35 and 36 extend into the slot in the spool 20, thus allowing the chuck jaws to be opened. When the spool 20 is moved to the right from Figure 1 to the position as indicated in Figure 2, the toggle 19 is straightened and the toggle roller 37 engages the inside surface 43 of the spool 20. To insure the roller 37 again entering the slot to engage the cam surface 42, the spool 20 and the hollow rotary spindle 11 are provided with a complementary key 44 which keeps the spool 20 in proper alignment on the hollow rotary spindle 11. The key 44 prevents the spool 20 turning about the spindle 11 and permits only sliding movement axially of the spindle. The spool 20 may be moved back and forth by an air or hydraulic cylinder (not shown in the drawings) which operate through a yoke 45 extending in the groove 46 on the outside of the spool 20. The exact structure of this yoke and the mechanism for moving the spool back and forth is not herein described since many suitable devices have been used for similar purposes and are well known to the trade.

When the center sleeve or spool is pushed from left to right in the drawings (see Figures 1 and 2) and over the roller 37 of the toggle assembly 19, it will straighten out the toggle 19. The closer the roller 37 and pin 38 comes to the center line of the toggle 19 or the closer the fingers 35 and 36 are moved into a straight line in end to end position, the more power will be exerted by the sleeves 17 and 18 until the spool passes over the roller 37 to contact the straight portion or inside surface 43 directly behind the taper cam surface 42 to hold the toggle in fixed position. While the spool 20 slides over the toggle 19, one end or the other end of the chuck and chuck jaws 15 or 16 can contact the work and the opposite chuck jaw 15 or 16 will then follow the gripping of the first chuck jaws. In this instance, the chuck jaws 16 may begin to grip the axle 10 before the chuck jaws 15 begin to grip the axle. The compensation spring or "ocean wave" washer 29 between the first sleeve portion 27 and the second sleeve portion 28 will take care of the difference in variation of the diameter of forges. Thus, one set of jaws will first engage the axle, then the other set of jaws will engage the axle and finally both sets of jaws will be simultaneously forced into gripping engagement on to the axle at axially or longitudinally spaced locations therealong. The jaws will generally grip the axle in the spaced locations with an equal gripping power which is much greater than the force exerted by the spool 20 on the toggles 19. Since the compensating spring or washer 29 must compensate for any differences and variations in the forgings, the compressible resistance force of this spring washer 29 must be less than the axial separating force exerted by the force exerting means or toggle 19 on the sleeves 17 and 18.

With this structure, a spindle is constructed which has a very short axial dimension to leave both ends of the work or the axle 10 open for turning operations. Also a powerful chuck of two, three or more jaws operated by a sliding sleeve through the cam 30 from and to the compensating spring 29 and through an operating sleeve or spool 20 contacting the toggles 19 is provided. This accomplishes an extremely flexible chuck to open far enough to let the workpieces or axles 10 enter over a larger diameter on the ends thereof than the diameter where the workpiece or axle is to be gripped. The device compensates uniformly for the gripping of the chuck and chuck jaws because the sleeves 17 and 18, with the straightened toggle 19 therebetween, may move as a unit relative to the spindle 11, so that one set of jaws may be cammingly contracted more than the other set. The device compensates also for variations in diameter in successive workpieces.

Rough forges generally have dirt and scale thereon which would soon damage or prevent proper operation of a chucking device. In the present instance, a tube 50 positioned within the sleeves 17 and 18 prevents scale or dirt from the forged axle or workpiece 10 following or entering any of the working parts of the double end chucking mechanism. Each end of this tube 50 is supported by a tube support member 51 supported within the respective first sleeve portions 27. The tube support members 51 abut their respective chuck jaws 15 and 16 and the cover members in which these jaws slide. In observing the drawings, of Figure 1 and Figure 2, it is noted that the tube 50 and the tube support members 51 cooperate with the covers 23 and the chuck jaws 15 and 16 to provide a completely enclosed inside cylindrically surface spindle opening into which the workpiece or axle 10 is inserted. Any scale or dirt falling from the workpiece during the machining of the ends thereof cannot enter the working part of the spindle and can only be removed from the spindle on the ends thereof along with the workpiece.

During the working or machining of the ends of the workpiece 10, a cutting oil is often used which would follow the workpiece 10 into the chucking machine. This cutting oil is different from the bearing oil used to lubricate the working parts of the machine and should not be mixed therewith. The tube 50 and the support members 51 prevent cutting oil from entering the working mechanism of the spindle and into the slides and toggles. Similarly, the tube 50 prevents lubricating oil for the toggles 19, the slides and the chuck jaws, as well as the bearings 13 and 14, from running out of the machine. Lubricating oil must be provided for the toggles, the slides and the bearings to prevent wear and should not become mixed with cutting oil or dirt. The tube 50 and the tube support members 51 prevent this.

The machine housing 12 is provided with an opening therethrough in which the hollow rotary spindle 11 is bearingly supported by the bearings 13 and 14. On the end of the spindle 11 nearest the chuck 16 is an out-turned flange 54 on to which the covers 23 of the chuck 16 may be bolted or otherwise fastened. An adapter 55 positioned between the out-turned flange 54 and the covers of the chuck 16 adapts the chuck to the size of the out-turned flange and thus to the spindle 11.

The covers 23 of the chuck 15 is similarly bolted by bolts 25 to an adapter 57 threadable on the other end of the spindle 11. The threaded connection between the spindle 11 and the adapter 57 is illustrated by the reference character 58.

Each of the opposite walls of the housing 12 is provided with plates preferably made of brass and referred to by the characters 59 and 60 in the drawings. These plates 59 and 60 are inserts in the housing and have a part extending over the outer surfaces of their respective sides of the housing to form a heat, as well as bearing, support. The bearings 13 and 14 are between these plates 59 and 60 and bearingly supported on the housing walls directly. As is best illustrated in Figure 2 of the drawings, the plate 59 bearingly supports a flinger 61. The flinger 61 is bearingly rotatable in the plate 59 next adjacent the bearing 13 and the flinger 62 is bearingly rotatable in the plate 60 next adjacent the bearing 14. In this instance, the flinger 62 is positioned between the out-turned flange 54 of the rotary spindle 11 and the bearing 14.

The rotary spindle 11 is rotated by a gear 63 keyed thereto by a key 64 located by the flinger 61 next adjacent the bearing 13 and the adapter 57 which is threaded on the spindle as at 58. Thus the flinger 61 is between the gear 63, which drives the rotary spindle and the chucks 15 and 16 therewith, and the bearing 13.

In assembling the machine, the chucks 15 and 16 may be constructed separately and the chuck 16 mounted on the spindle 11. After the sleeves 17 and 18 and the toggle 19 have been inserted in the spindle 11, this subassembly may be inserted from right to left in Figures 1 and 2 through the housing 12 of the machine. It is understood that it is possible to insert the toggles 19 after the spindle has been positioned in the machine and that the spool 20 is fastened on the spindle after it has been inserted. With the bearings 13 and 14 and the flingers and other similar parts in place in the housing, the bearing plate 59 may be inserted in the housing 12. Next, the gear 63, as well as the whole chuck assembly 15 including the adapter 57, may be threaded on to the end of the spindle 11. The threading of the adapter 57 on to the spindle 11 tightens the bearings 13 and 14 and positions the flingers 61 and 62, as well as the other parts of the chuck, so that it can be operated. In operation, the yoke 45 is positioned to the left as illustrated in Figure 1 when the chuck jaws 15 and 16 are opened. When the yoke 45 is moved to the right as illustrated in Figure 2, the toggle 19 is flattened to operate through the sleeves 17 and 18 and through the cam surfaces 30 to close the chuck jaws 15 and 16. The pressures exerted by the jaws on the workpiece are substantially uniform as herein before described and are adequately powerful to grip the workpiece for fast machining by carboloy or other fast cutting tools. After the workpiece has been machined or completely finished on both ends thereof, the yoke 45 may again be moved to the left to the position of Figure 1 whereby the springs 24 and 32 cause an opening of the chuck jaws 15 and 16 to release the powerful chucking grip on the workpiece 10. It is understood that with the present invention both ends of the workpiece extend out of opposite sides of the housing 12 and may be machined or worked simultaneously. In the present instance, the exact tools used for working the ends of the workpiece have not been described since it is understood that any suitable tools commonly used in the machine tool industry may be used depending on the exact finished product desired.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A double-end turning mechanism for turning a workpiece having an axis and opposite ends to be worked simultaneously, said mechanism comprising, a hollow rotary spindle having an axial length less than the axial length of the workpiece to be turned whereby both ends of the workpiece may be worked simultaneously, bearings support means spaced apart and bearingly supporting said spindle for rotational turning, a driving gear secured to said spindle for rotationally turning the same, radially movable chuck jaws on each end of said spindle to grip the workpiece at axially spaced locations other than the ends of the workpiece, a tube within said spindle extending between said chuck jaws and adapted to receive the workpiece to be gripped by said jaws, a pair of axially separable sleeves encircling said tube and slidable in said spindle with each sleeve in cammed relationship with its respective of said chuck jaws, covers covering said chuck jaws, first springs between said chuck jaws and their respective covers urging said jaws radially from the axis of the spindle and into cammed engagement with the sleeves, second springs at least one between each sleeve and its closest cover, urging the sleeves towards each other and away from said chuck jaws, said covers having openings concentric with the spindle and through which the ends of a workpiece being worked extend, said spindle having at least an aperture aligned between said spaced sleeves, force exerting means between said sleeves operable to separate the sleeves axially, each of said sleeves including first and second portions, a spring washer between said portions having a compressible resistance force less than the axial separating force exerted by said force exerting means, said force exerting means constituting a pair of fingers pivotally joined together at the mean ends thereof with the extreme end of each finger socketed in its respective sleeve, the mean ends of said fingers extending outwardly through the aperture in the spindle, a cam roller carried by the mean ends of said fingers, and a spool having a cam surface engaged by the roller, said spool slidable axially on the spindle for camming the roller radially inwardly to straighten the fingers and force the sleeves apart.

2. A double-end turning mechanism for turning a workpiece having an axis and opposite ends to be worked simultaneously, said mechanism comprising, a hollow rotary spindle having an axial length less than the axial length of the workpiece to be turned whereby both ends of the workpiece may be worked simultaneously, bearing support means spaced apart and bearingly supporting said spindle for rotational turning, a driving gear secured to said spindle for rotationally turning the same, radially movable chuck jaws on each end of said spindle to grip the workpiece at axially spaced locations other than the ends of the workpiece, a tube within said spindle extending between said chuck jaws and adapted to receive the workpiece to be gripped by said jaws, a pair of axially separable sleeves encircling said tube and slidable in said spindle with each sleeve in cammed relationship with its respective of said chuck jaws, covers covering said chuck jaws, springs between said chuck jaws and their respective covers urging said jaws radially from the axis of the spindle and into cammed engagement with the sleeves, said covers having openings concentric with the spindle and through which the ends of a workpiece being worked extend, said spindle having at least an aperture aligned between said spaced sleeves, force exerting means between said sleeves operable to separate the sleeves axially, each of said sleeves including first and second portions, a spring washer between said portions having a compressible resistance force less than the axial separating force exerted by said force exerting means, said force exerting means constituting a pair of fingers pivotally joined together at the mean ends thereof with the extreme end of each finger abutting its respective sleeve, the mean ends of said fingers extending outwardly through the aperture in the spindle, and a spool axially slidable on said spindle between said spaced bearing support means, said spool having cam means engaging the pivotally joined mean ends of said fingers for compressing the fingers radially and thereby spreading the extreme ends thereof axially to separate the sleeves.

3. A double-end turning mechanism for turning a workpiece having an axis, said mechanism comprising, a rotary spindle having an axial length less than the axial length of the workpiece to be turned, bearing support means spaced apart and bearingly supporting said spindle for rotational turning, a driving gear secured to said spindle for turning the spindle, radially movable chuck jaws on each end of said spindle to grip the workpiece at spaced locations axially thereof, a tube within said spindle extending between said chuck jaws and adapted to encompass a workpiece to be gripped by said jaws, a pair of axially separable sleeves encircling said tube and slidable in said spindle with each sleeve in cammed relationship with its respective chuck jaw, and force exerting means between said sleeves operable to separate the sleeves axially, each of said sleeves including resilient means having a compressible resistance force less than the axial separating force exerted by said force exerting means, said force exerting means constituting a pair of fingers pivoted together with each finger abutting its respective sleeve and a spool axially slidable on said spindle between said spaced bearing support means, said spool having cam means for compressing the fingers radially and thereby expanding them axially to separate the sleeves.

4. A double-end turning mechanism for turning a workpiece having an axis, said mechanism comprising, a rotary spindle having an axial length less than the axial length of the workpiece to be turned, bearing support means spaced apart and bearingly supporting said spindle for rotational turning, radially movable chuck jaws on each end of said spindle to grip the workpiece at spaced locations axially thereof, a tube within said spindle extending between said chuck jaws and adapted to encompass a workpiece to be gripped by said jaws, a pair of axially separable sleeves encircling said tube and slidable in said spindle with each sleeve in cammed relationship with its respective chuck jaw, and force exerting means between said sleeves operable to separate the sleeves axially, each of said sleeves including resilient means having a compressible resistance force less than the axial separating force exerted by said force exerting means, said force exerting means constituting a pair of fingers pivoted together with each finger abutting its respective sleeve and a spool axially slidable on said spindle between said spaced bearing support means, said spool having cam means for compressing the fingers radially and thereby expanding them axially to separate the sleeves.

5. A double-end turning mechanism for turning a workpiece having an axis, said mechanism comprising, a rotary spindle having an axial length less than the axial length of the workpiece to be turned, radially movable chuck jaws on each end of said spindle to grip the workpiece at spaced locations axially thereof, a tube within said spindle extending between said chuck jaws and adapted to encompass a workpiece to be gripped by said jaws, a pair of axially separable sleeves encircling said tube and slidable in said spindle with each sleeve in cammed relationship with its respective chuck jaw, and force exerting means between said sleeves operable to separate the sleeves axially, each of said sleeves including resilient means having a compressible resistance force less than the axial separating force exerted by said force exerting means, said force exerting means constituting a pair of fingers pivoted together with each finger abutting its respective sleeve and a spool axially slidable on said spindle between said spaced bearing support means, said spool having cam means for compressing the fingers radially and thereby expanding them axially to separate the sleeves.

6. A double-end turning mechanism for turning a workpiece having an axis, said mechanism comprising, a rotary spindle, radially movable chuck jaws on each end of said spindle to grip the workpiece at spaced locations axially thereof, a pair of axially separable sleeves slidable in said spindle with each sleeve in cammed relationship with its respective chuck jaw, and force exerting means between said sleeves operable to separate the sleeves axially, each of said sleeves including resilient means having a compressible resistance force less than the axial separating force exerted by said force exerting means, said force exerting means constituting a pair of fingers pivoted together with each finger abutting its respective sleeve and a spool axially slidable on said spindle between said spaced bearing support means, said spool having cam means for compressing the fingers radially and thereby expanding them axially to separate the sleeves.

7. A double-end turning mechanism for turning a workpiece having an axis, said mechanism comprising, a rotary spindle, radially slidable chuck jaws on each end of said spindle to grip the workpiece at spaced locations axially thereof, a pair of axially separable sleeves, said spindle and said sleeves being relatively slidable and with each sleeve in cammed relationship with its respective chuck jaw, and force exerting means between said sleeves operable to separate the sleeves axially, said force exerting means constituting a pair of fingers pivoted together with each finger abutting its respective sleeve and a spool axially slidable on said spindle between said spaced bearing support means, said spool having cam means for compressing the fingers radially and thereby expanding them axially to separate the sleeves.

8. A double-end turning mechanism for turning a workpiece having an axis, said mechanism comprising, a rotary spindle having an axial length less than the axial length of the workpiece to be turned, bearing support means spaced apart and bearingly supporting said spindle for rotational turning, a driving gear secured to said spindle for turning the spindle, radially movable chuck jaws on each end of said spindle to grip the workpiece at spaced locations axially thereof, a tube within said spindle extending between said chuck jaws and adapted to receive a workpiece to be gripped by said jaws, a pair of axially separable sleeves encircling said tube and slidable in said spindle with each sleeve in cammed relationship with its respective of said chuck jaws, and force exerting means between said sleeves operable to separate the sleeves axially, each of said sleeves including resilient means having a compressible resistance force less than the axial separating force exerted by said force exerting means.

9. A double-end turning mechanism for turning a workpiece having an axis, said mechanism comprising, a rotary spindle having an axial length less than the axial length of the workpiece to be turned, radially movable chuck jaws on each end of said spindle to grip the workpiece at spaced locations axially thereof, a tube within said spindle extending between said chuck jaws and adapted to receive a workpiece to be gripped by said jaws, a pair of axially separable sleeves encircling said tube and slidable in said spindle with each sleeve in cammed relationship with its respective chuck jaw, and force exerting means between said sleeves operable to separate the sleeves axially, each of said sleeves including resilient means having a compressible resistance force less than the axial separating force exerted by said force exerting means, said force exerting means constituting a pair of fingers pivoted together with each finger abutting its respective sleeve and a spool axially slidable on said spindle between said spaced bearing support means, said spool having cam means for compressing the fingers radially and thereby expanding them axially to separate the sleeves.

10. A double-end turning mechanism for turning a workpiece having an axis, said mechanism comprising, a rotary spindle, radially slidable chuck jaws on each end of said spindle to grip the workpiece at spaced locations axially thereof, a pair of axially separable sleeves slidable relative to said spindle with each sleeve in cammed relationship with its respective chuck jaw, and force exerting means between said sleeves operable to separate the sleeves axially, each of said sleeves including resilient means having a compressible resistance force less than the axial separating force exerted by said force exerting means.

11. A double-end turning mechanism for turning a workpiece having an axis, said mechanism comprising, a rotary spindle having an axial length less than the axial length of the workpiece to be turned, bearing support means spaced apart and bearingly supporting said spindle for rotational turning, a driving gear secured to said spindle for turning the spindle, radially slidable chuck jaws on each end of said spindle to grip the workpiece at spaced locations axially thereof, a tube of a given diameter within said spindle extending between said chuck jaws and adapted to receive a workpiece to be gripped by said jaws, a pair of axially separable sleeves encircling said tube and slidable in said spindle with each sleeve in cammed relationship with its respective of said chuck jaws, and force exerting means between said sleeves operable to separate the sleeves axially to radially compress said slidable chuck jaws to a diameter at least thirty percent less than said given diameter, each of said sleeves including resilient means having a compressible resistance force less than the axial separating force exerted by said force exerting means.

12. A double-end turning mechanism for turning a workpiece having an axis, said mechanism comprising, a rotary spindle having an axial length less than the axial length of the workpiece to be turned, radially slidable chuck jaws on each end of said spindle to grip the workpiece at spaced locations axially thereof, a pair of axially separable sleeves slidable in said spindle with each sleeve in cammed relationship with its respective chuck jaw, and force exerting means between said sleeves operable to separate the sleeves axially, said force exerting means constituting a pair of fingers pivoted together with each finger abutting its respective sleeve and a spool axially slidable on said spindle between said spaced bearing support means, said spool having cam means for compressing the fingers radially and thereby expanding them axially to separate the sleeves to radially compress said slidable chuck jaws a material amount from their expanded chucking diameter.

ALFRED E. DRISSNER.

REFERENCES CITED

The following references are of record in the file of this patent:

UNITED STATES PATENTS

| Number | Name | Date |
| --- | --- | --- |
| 66,107 | Strayer et al. | June 25, 1867 |
| 818,993 | Barr | Apr. 24, 1906 |
| 1,979,367 | Cone | Nov. 6, 1934 |
| 2,372,592 | Lovely | Mar. 27, 1945 |